United States Patent [19]

Scaglia

[11] Patent Number: 4,757,778
[45] Date of Patent: Jul. 19, 1988

[54] DEVICE FOR ADJUSTING THE LENGTH OF THE MAST OR BOOM IN A WINDSURF OR THE LIKE

[76] Inventor: Enzo Scaglia, 21, Via Monterosa, Milano, Italy, 20100

[21] Appl. No.: 884,065

[22] Filed: Jul. 10, 1986

[30] Foreign Application Priority Data

Jul. 25, 1985 [IT] Italy ............... 22615 B/85

[51] Int. Cl.⁴ ............................. B63H 9/08
[52] U.S. Cl. ....................... 114/97; 403/109
[58] Field of Search ............... 114/89–101, 114/39, 39.2; 441/65, 74; 248/157, 423; 403/104, 109, 377; 285/342, 330, 302, 353, 31, 32, 80, 113, 138, 139, 918, 332.2

[56] References Cited

U.S. PATENT DOCUMENTS 2,344,425  3/1944  Snyder ........................ 403/109
2,685,460  8/1954  Ogborn ........................ 403/109
3,722,903  3/1973  Jones ........................... 403/109
4,419,025  12/1983 Takahashi ..................... 403/109
4,640,211  2/1987  Namur ......................... 403/109

FOREIGN PATENT DOCUMENTS 2543510 10/1984 France .

Primary Examiner—Sherman D. Basinger
Assistant Examiner—Clifford T. Bartz
Attorney, Agent, or Firm—Lerner, David, Littenberg, Krumholz & Mentlik

[57] ABSTRACT

The invention relates to a device for adjusting the length of a telescopic mast or boom in a windsurf. The two tubular elements are fixed by means of an O-ring freely movable on the inner tube and squashed against said inner tube by means of a bushing integral to the external tube.

9 Claims, 1 Drawing Sheet

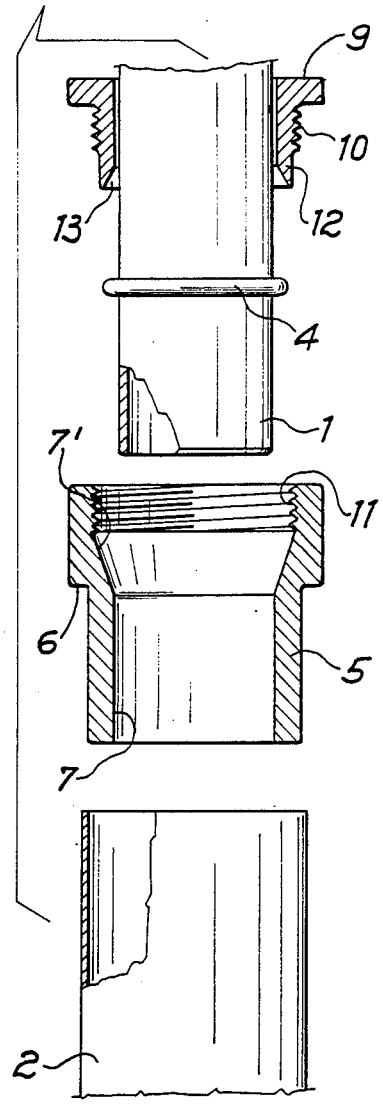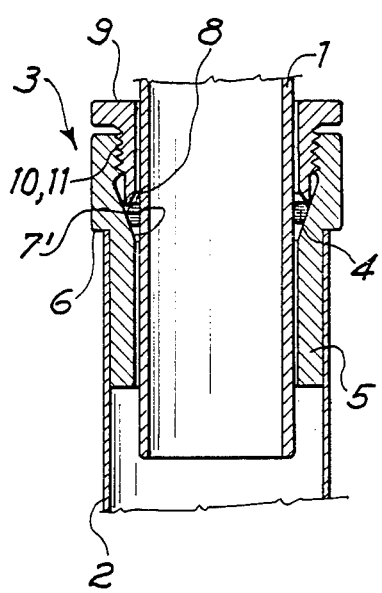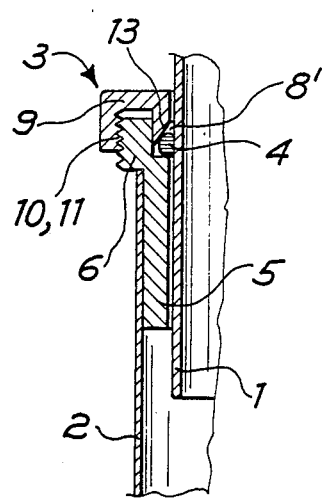

4,757,778

DEVICE FOR ADJUSTING THE LENGTH OF THE MAST OR BOOM IN A WINDSURF OR THE LIKE

BACKGROUND OF THE INVENTION

1. FIELD OF THE INVENTION

The present invention relates to small sailboats, such as for instance fin keels or windsurfs, and concerns a device to adjust the length of the mast or the boom.

2. DESCRIPTION OF THE PRIOR ART

Mainly in the field of windsurfs, extensible masts are known to allow the use sails having different size. Said masts generally consist of a couple of tubes telescopically introduced the one into the other, the one with larger diameter constituting the base of the mast itself and the one with smaller diameter the adjustable extension. Considering that the sail is tightened at the two ends of the mast, the latter is compressively stressed and the two tubes are blocked in the desired position by simply stopping insertion of the extension tube in the base tube. For this purpose the external circumferential surface of the tube having a smaller diameter presents a series of spaced circumferential grooves, each one corresponding to a reciprocal position of the two tubes and one of which houses a blocking element. Said blocking element is generally constituted by a ring of elastic material or by a coupling capable of radial deformation and presenting a couple of opposed circumferential collars, the inner one of which penetrating into one of said grooves and the outer one urging against the upper edge of the base tube.

In the first case, once the elastic ring is housed in one of said grooves, the extension tube is inserted into the base tube until the ring itself, interfering with a bushing integral to the tube having a larger diameter, stops the insertion of the extension tube.

In the second case, the coupling is radially dilated and moved along the extension tube as far as the desired groove is reached; once said coupling is positioned in correspondence with said groove, it is inserted together with the extension tube into the base tube until its outer collar rests on the edge of the latter.

The main disadvantage of said known devices is in that they do not allow for a continuous adjustment of the insertion of one tube into the other, as the reciprocal locking of the two tubes is obtained by means of said spaced circumferential grooves and moreover they require expensive processing of the grooves with weakening of the inner tube.

A further disadvantage of the devices known up to now is that they are not watertight and thus allow water to penetrate into the tube having a larger diameter. Specially when the boat is used in sea, said water infiltrations generate a salinity fouling inside the tube having a larger diameter, which makes the extension tube sliding difficult.

OBJECTS OF THE INVENTION

A main object of this invention is to provide a locking device which allows a continuous adjustment of the reciprocal position of the tubes constituting the mast or the boom of the boat, and which avoids the need of grooves on the inner tube.

Another object of the present invention is to provide a locking element capable of obtaining a sealing between the tubes in a way as to prevent water from entering inside the same.

SUMMARY OF THE INVENTION

Said objects are achieved by means of a device to stop in whatever position the telescopic insertion of the two tubes forming the mast or the boom of a windsurf or the like, or belonging to them, characterized in that it comprises a ring of elastic material freely movable on the inner tube, a bushing integral to the outer tube and in which the inner tube is inserted in a slidingly way, said bushing having a seat for housing said ring of elastic material; and a means to press said ring of elastic material in its seat, against the inner tube.

In a preferred embodiment, the bushing hole, in correspondence to the end turned towards the ring, widens conically at least partly house, press and deform said ring of elastic material. A closing cap can be foreseen to hold the elastic ring in position even when the two tubes are submitted to traction.

In particular, it is advisable that the flare of the bushing hole presents a taper angle ranging between 10° and 30° and preferably around 20°, while the ring is a so-called O-ring of soft rubber. Alternatively, the bushing can have an O-ring seat which is cylindrical and in this case the cap will present such a configuration as to squash said O-ring in working position.

Further characteristics and details of the device according to the invention will be now described with reference to the accompanying drawing where:

BRIEF DESCRIPTION OF THE DRAWING

FIG. 1 is a cross-section view of two tubes and a device to stop them in position of reciprocal presentation before their assembling:

FIG. 2 is a cross-section view of said tubes and device to stop them in position of reciprocal engagement;

FIG. 3 is a partial section view of an alternative embodiment.

DESCRIPTION OF THE PREFERRED EMBODIMENTS

With reference to the accompanying drawing, the mast of a sailboat is formed by a couple of tubes 1 and 2 which are designed to be telescopically inserted the one into the other.

One of the two tubes (tube 2) constitutes the base of the mast or one of the connecting tubes of the boom, while the other (tube 1) is an extension of same. In order to allow adjustment of the length of said extension, a device is foreseen to stop the insertion of a tube into the other, generally indicated by reference 3.

Said device comprises an elastic ring 4, preferably of toroidal shape made of soft rubber, such as a usual commercially available O-ring, and a bushing 5 which is inserted into the tube of larger diameter 2 until the edge of latter rests against a circumferential collar 6 presented on the external surface of the bushing itself. The tube having smaller diameter 1 is first of all inserted into the ring 4 and then into the tube having larger diameter through the bushing 5.

The hole 7 of bushing 5, in correspondence to the end in which the tube 1 is inserted, widens conically, as in 7', so as to form, between the tube 1 and bushing itself, a groove 8 having decreasing size. More in detail, the taper angle of said groove ranges between 10° and 30° and is preferably around 20°; the maximum diameter of opening 7' of bushing 5 is preferably higher than the maximum diameter of ring 4, but in any case not smaller than the average diameter of the latter.

When the tube 1 is inserted into tube 2, the rubber ring 4 approaches to the bushing 5 until it interferes with the latter, in particular with the external edge or the wall of its conical taper. In this way the ring 4 is stopped by the bushing 5 and further insertion of the tube 1 into tube 2 determines forced introduction of the ring 4 inside the groove 5, with subsequent squashing of the ring itself between the inner wall of the bushing and outer surface of tube 1. Said squashing involves a friction increase between the ring 4 and the tube 1, which is thus blocked by the impossibility of the ring itself to penetrate into the hollow space existing between the bushing and the tube 1 and by the friction existing between the ring 4 and tube 1 itself. In order to maximize the friction between tube 1 and rubber ring, the external circumferential surface of tube 1 can be roughened for example by means of scratches. When the sail is inserted, the two tubes are stressed one towards the other and consequently the rubber ring is kept pressed between the tube 1 and bushing 5, achieving watertightness between them. In order to prevent any water infiltration between the tubes, the external circumferential surface of the bushing 5 designed to be inserted into the tube 2 can be provided with a groove for housing a rubber ring (not illustrated) which has a sealing action for the hollow space existing between the bushing 5 and tube 2.

The adjustment of the position of the tube 1 is performed very simply by rolling the ring 4 along the tube itself as far as the desired position is reached, when the two tubes are not forced one against the other. It should be underlined that the lack of grooves or the like allows a continuous adjustment of the ring position along the tube 1 and therefore of the reciprocal position of the two tubes.

As above said, the device according to the invention can be advantageously applied also to the boom of a small sailboat, windsurf or the like, so as to allow length adjustment. Specially in said latter case, however, the methods of performing the sailing and the boat guide can determine conditions in which the two telescopic tubes are temporarily no longer compressively stressed, in the sense of lengthening of the telescopic group. Said movement, followed by a return to normal working conditions of compressive stressing, can determine a displacement of the O-ring along the tube 1, modifying the position of the two tubes. In order to avoid that, an element holding the ring 4 in said seat 8 is provided, for instance under the form of a cap 9 inserted on the tube 1 and adapted to be fixed in any suitable removable way, for example by means of threadings 10 and 11, to the bushing 5. The cap 9 is provided with a projection 12 which penetrates into the seat 8, resting on the ring 4 to press and hold it in position by a conical surface 13 even when the two tubes 1 and 2 are pulled, thus ensuring that they never undergo reciprocal movements.

The embodiment of FIG. 3 is similar to the previous one and for equal parts the same references have been used. In this case the cap 9 is mounted on the bushing 5 by means of outwardly placed threads 10, 11.

I claim:

1. In a windsurf mast or boom having internal and external tubes that are axially telescopically slideable relative to one another, a device for locking the tubes in selected axial relationships to one another, comprising a continuous annular elastomeric ring having an inner diameter which is no greater than the outer diameter of said internal tube and having a circular cross-section at all radial planes thereof so that said ring can be easily and rapidly axially moved along said internal tube by rotating the same on said tube, the outer surface of the telescoping portion of said inner tube being essentially devoid of any circumferentially extending grooves thereon which can act as a seat for said elastomeric ring, a bushing member carried by said external tube for slidingly receiving said internal tube, said bushing member including a seat thereon to receive said elastomeric ring, and a squashing member cooperative with said bushing member, at least one of said members including an elongated conical surface thereon that makes an angle with the axis of said tubes in the range of from 10° to 30° and that has a maximum diameter greater than and a minimum diameter less than the outside diameter of said elastomeric ring, for squeezing said elastomeric ring between said conical surface and the outer surface of said internal tube thereby to axially lock said internal tube to said bushing member.

2. A device according to claim 1 wherein said squashing member comprises a cap member that is removably fixed to said bushing member and has means to hold said elastomeric ring in a working position intermediate said cap and bushing members even when forces are applied tending to pull the tubes apart.

3. A device according to claim 2 wherein said means holding the elastomeric ring comprises a projection on said cap member, which penetrates into the seat for the elastomeric ring.

4. A device according to claim 3 wherein said projection includes a conical wall surface having a taper converging towards the internal tube.

5. A device according to claim 3, wherein said projection includes a wall surface which comprises said conical surface, said wall surface having a taper converging towards the internal tube.

6. A device according to claim 5, wherein said conical surface makes an angle of 20° with the axis of said tubes.

7. A device according to claim 1, wherein said bushing member includes an external circumferential surface, said surface having a collar integrally formed thereon on which the external tube seats.

8. A device according to any one of claims 1 or 7, wherein the external circumferential surface of the internal tube is roughened by means of scratches to increase the frictional contact between the internal tube and the elastomeric ring.

9. A device according to claim 8, wherein said seat of said bushing member comprises said conical surface, said seat having a taper converging towards the internal tube.

* * * * *